March 24, 1925.
M. S. DICK
ADJUSTABLE BACKING OFF SPEAR
Filed Nov. 10, 1923
1,530,764
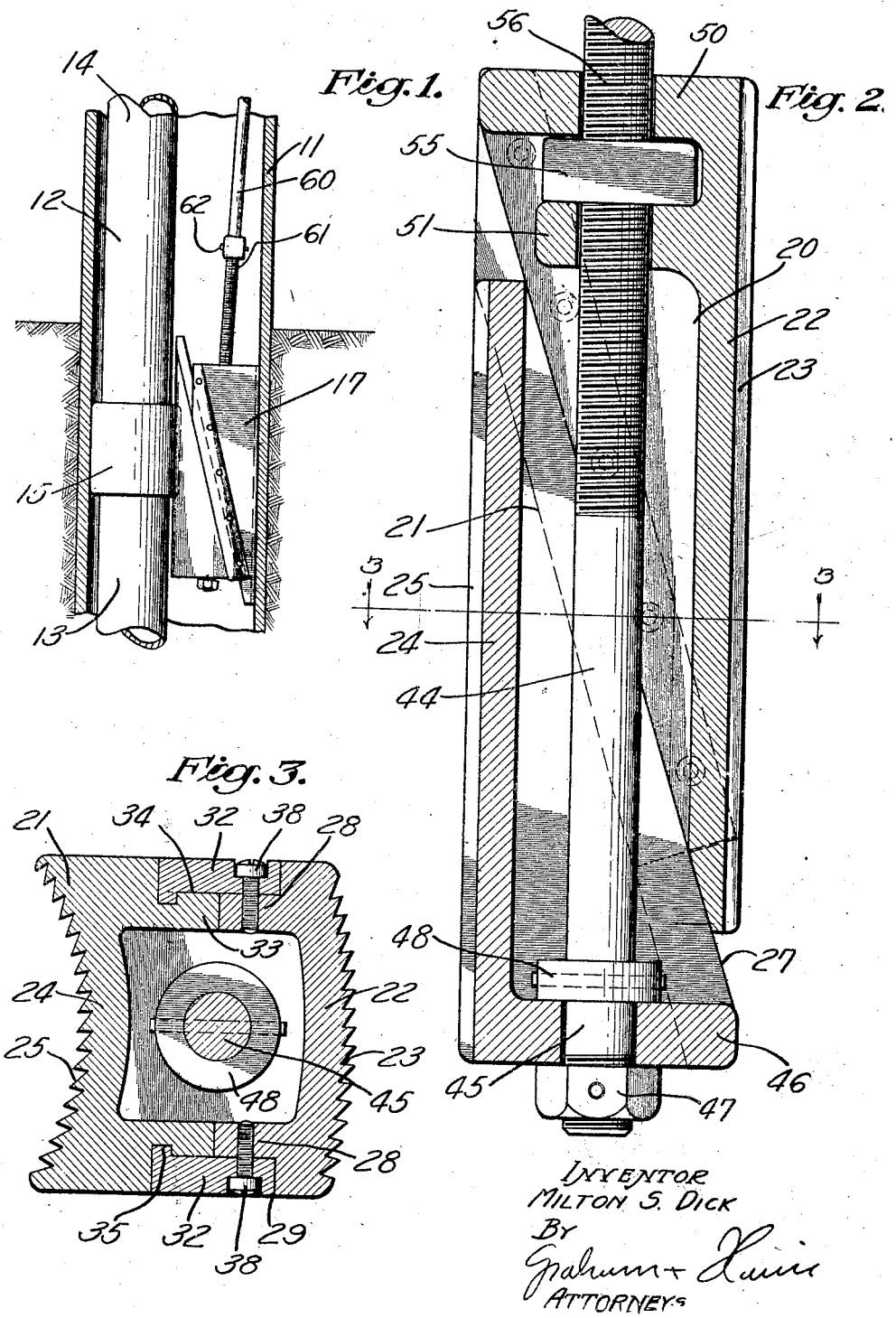

Patented Mar. 24, 1925.

1,530,764

UNITED STATES PATENT OFFICE.

MILTON S. DICK, OF WHITTIER, CALIFORNIA, ASSIGNOR OF ONE-HALF TO W. J. WELLMAN, OF LOS ANGELES, CALIFORNIA.

ADJUSTABLE BACKING-OFF SPEAR.

Application filed November 10, 1923. Serial No. 673,967.

*To all whom it may concern:*

Be it known that I, MILTON S. DICK, a citizen of the United States, residing at Whittier, in the county of Los Angeles and State of California, have invented a new and useful Adjustable Backing-Off Spear, of which the following is a specification.

This invention relates to equipment employed in the oil well industries and relates particularly to a device for holding a casing collar so that an upper joint of casing may be unscrewed from the casing string.

In the drilling of oil wells, it is necessary at frequent intervals to reduce the diameter of the hole as the depth thereof increases. The hole is drilled as far as practical with a large diameter bit and large diameter casing set. The size of the hole is then reduced and a string of casing of corresponding size placed therein, this casing extends the full depth of the hole. The small diameter casing is allowed to extend to the top of the well and after placement, is cemented off at the lower end of the large diameter hole in which large casing has been previously placed. After the small casing has been cemented in, it is frequently necessary to cut off the upper end of the casing to bring it down to the proper level for receiving the casing head. This cutting off may be accomplished most satisfactorily by unscrewing the upper length of casing and cutting and threading same, whereupon it is again screwed into the top of the string of casing and is then ready to receive the casing head.

It is found that in an attempt to unscrew the upper joint of casing, the rotation applied at the upper end will often cause the unscrewing of a joint a considerable distance down from the top.

It is the object of my invention to provide a spear for gripping the collar at which the length of casing is to be unscrewed, so that this casing may be unscrewed without danger of breaking a joint at a lower level.

The invention provides an expansible member having teeth on the outer faces thereof so that when the member is expanded, these teeth will embed in the previously placed casing and the collar, thus securing the collar against rotation.

The especial advantages and further objects of the invention will be made evident hereinafter.

Referring to the drawing, which is for illustrative purposes only:

Fig. 1 is a fragmentary view showing the use of the backing off spear.

Fig. 2 is an enlarged sectional view of the backing off spear in collapsed disposal.

Fig. 3 is a section taken on a plane represented by the line 3—3 of Fig. 2.

In Fig. 1 of the drawing, 11 represents a large diameter casing which has been previously set in the well. In this casing, a smaller casing 12 has been placed and cemented in the customary manner. Between the downwardly extending portion 13 of the casing and the upper length of casing 14 which it is desired to unscrew, is a collar 15. The casing spear 17 is shown in expanded position between the wall of the casing 11 of the collar 15, in which position the collar 15 is securely gripped so that it cannot rotate when torsion is applied to the length 14. As shown in Figs. 2 and 3, the expansible member constituting the casing spear is comprised of a primary wedge member 20 and a secondary wedge member 21. The outer face 22 of the primary wedge is of convex form and is provided with longitudinal teeth 23. The second wedge member 21 has the face 24 thereof formed concave and is provided with teeth 25. The co-operating inclined faces 27 of the wedge members are machined and the side walls 28 of the primary member 20 are channeled out as indicated at 29 to receive the edges of side plates 32.

The side walls 33 of the secondary member 21 are channeled as indicated at 34 to receive the opposite edges of the plates 32 which have inwardly extending flanges 35 thereof arranged to inter-lock with the member 21 in the manner shown.

Machine screws 38 are provided which screw through the walls 28, thus combining the side plate with the primary wedge 20 and causing them to move along the channels 34 of the secondary member 21 when a relative movement is provided between the wedge members.

In order to cause a relative expansion of the spear, a relative movement between the wedge members 20 and 21 is provided in the directions indicated by the arrows 42 and 43. This movement is accomplished by means of a screw 44, the lower end 45 of which extends through an opening in the bottom wall 46 of the secondary wedge member 21 and is secured against longitudinal movement by collars 47 and 48. Adjacent to the end wall 50 of the primary wedge member 20 is a division wall 51 which is spaced away from the wall 50 a distance sufficient to provide space for a nut 55 through which the threaded portion 56 of the screw 44 extends. By rotating the screw 44, it is caused to advance through the nut 55, thus accomplishing a relative movement between the wedge members 20 and 21. The spear is generally suspended from a small diameter pipe 60, Fig. 1, which may be conveniently secured to the upper end 61 of the screw 44 by the use of a pin 62.

The spear is lowered between the outer casing 11 and the inner casing 12 in collapsed position as shown in Fig. 2, whereupon the pipe 60 is rotated and the wedges 20 and 21 expanded so as to embed the teeth 23 and 25 respectively in the walls of the casing 11 and the collar 15. The upper length of casing 14 may then be unscrewed from the collar 15, cut to the proper length, and threaded to receive the casing head. The teeth 23 and 25 are in the drawing pitched to resist left hand rotation of the collar 15, as it is customary to provide casing with right hand threads which consequently are unscrewed by rotating in left hand direction.

I claim as my invention:

1. In an adjustable backing off spear, the combination of: an expansible member adapted to be lowered into a casing; and means for expanding said member when the desired point has been reached.

2. In an adjustable backing off spear, the combination of: an expansible member adapted to be lowered into a casing; and rotary means for expanding said member when the desired point has been reached.

3. In an adjustable backing off spear, the combination of: an expansible member adapted to be lowered between inner and outer pipe members; gripping teeth arranged on said expansible member; and means for expanding said member when the desired point has been reached.

4. In an adjustable backing off spear, the combination of: an expansible member adapted to be lowered between inner and outer pipe members; gripping teeth arranged on said expansible member; and rotary means for expanding said member when the desired point has been reached.

5. In an adjustable backing off spear, the combination of: an expansible member adapted to be lowered between inner and outer pipe members, said expansible member comprising cooperating wedge members having gripping teeth on the outer surfaces thereof; and means for accomplishing a relative longitudinal movement between said wedge members.

6. In an adjustable backing off spear, the combination of: an expansible member adapted to be lowered between inner and outer pipe members, said expansible member comprising cooperating wedge members having gripping teeth on the outer surfaces thereof; and a screw for accomplishing a relative longitudinal movement between said wedge members.

7. In an adjustable backing off spear, the combination of: an expansible member adapted to be lowered between inner and outer pipe members, said expansible member comprising an outer wedge member having a convex, toothed face, and an inner wedge member having a concave, toothed face; and means for accomplishing a relative longitudinal movement between said wedge members.

8. In an adjustable backing off spear arranged for lowering between inner and outer pipe members, the combination of: an outer wedge member; an inner wedge member; and means for accomplishing a relative longitudinal movement between said wedge members.

9. In an adjustable backing off spear arranged for lowering between inner and outer pipe members, the combination of: an outer wedge member; an inner wedge member, having channels formed in the sides thereof; side plates secured to said outer wedge member, said side plates engaging in said channels for aligning said wedge members; and means for accomplishing a relative longitudinal movement between said wedge members.

10. In an adjustable backing off spear arranged for lowering between inner and outer pipe members, the combination of: an outer wedge member; an inner wedge member; a nut retained by one of said wedge members; and a shaft threaded through said nut and being rotatable but non-longitudinally movably secured to the other of said wedge members, a rotation of said shaft causing said nut to move along said shaft and thereby producing a relative movement between said wedge members.

11. In an adjustable backing off spear arranged for lowering between inner and outer pipe members, the combination of: an outer wedge member; an inner wedge member, having channels formed in the sides thereof; side plates secured to said outer wedge member, said side plates engaging in said channels in a manner to align said wedge members; a nut retained by one of said wedge members; and a shaft threaded through said nut and being rotatably but non-longitudinally movably secured to the other of said wedge members, a rotation of said shaft causing said nut to move along said shaft and thereby producing a relative movement between said wedge members.

In testimony whereof, I have hereunto set my hand at Los Angeles, California, this 23rd day of October, 1923.

MILTON S. DICK.